United States Patent [19]

Carter et al.

[11] Patent Number: 4,903,222

[45] Date of Patent: Feb. 20, 1990

[54] ARRANGEMENT OF COMPONENTS IN A LAPTOP COMPUTER SYSTEM

[75] Inventors: R. Richard Carter, Cypress; Thomas Mitchell; Douglas C. Bushman, both of Houston, all of Tex.

[73] Assignee: Compaq Computer Corporation, Del.

[21] Appl. No.: 257,952

[22] Filed: Oct. 14, 1988

[51] Int. Cl.$^4$ ............................................. G06F 1/00
[52] U.S. Cl. .................................................... 364/708
[58] Field of Search ............................ 364/708, 709.1; 361/391

[56] References Cited

U.S. PATENT DOCUMENTS

| | | | |
|---|---|---|---|
| 4,571,456 | 2/1986 | Paulsen et al. | 364/708 X |
| 4,680,674 | 7/1987 | Moore | 364/708 X |
| 4,734,874 | 3/1988 | Hwang et al. | 364/708 |
| 4,742,478 | 5/1988 | Nigro, Jr. et al. | 364/708 |
| 4,769,764 | 9/1988 | Levanon | 364/708 |

OTHER PUBLICATIONS

Paul Somerson, "Boxing the (Grid) Compass", *PC Magazine*, Aug., 1983, pp. 322–332.
Various, "Take It or Leave It: Portables With Desktop Power", *PC Magazine*, Oct. 11, 1988, pp. 92–155.

*Primary Examiner*—Gary V. Harkcom
*Assistant Examiner*—Tan V. Mai
*Attorney, Agent, or Firm*—Arnold, White & Durkee

[57] ABSTRACT

A portable computer system with the full functionality of a desktop computer is designed so that components are arranged in a highly space efficient manner. The main system unit includes a removable keyboard, a fold-up display screen, floppy and fixed disk drives, and an internal modem, and has both external AC and internal battery power supplies. The system further includes a desktop expansion base into which the main system unit can be inserted, providing additional functionality for the main system unit. The components of the system are arranged to provide a convenient and efficient user interface.

1 Claim, 1 Drawing Sheet

ARRANGEMENT OF COMPONENTS IN A LAPTOP COMPUTER SYSTEM

BACKGROUND OF THE INVENTION

This inention relates to digital computers, and more particularly relates to a configuration philosophy for laptop computers.

As the size of semiconductor devices and various other computer components has decreased dramatically in the past decade, computer manufacturers have been able to provide progressively smaller computer systems having the same or improved computational abilities as their larger predecessors. Computers of the laptop size for personal or business usage, for example, may typically have a width of 35 cm and a depth of 22 cm, thus occupying approximately 770 sq. cm of a desktop, while an equally functional desktop computer might have a width of 50 cm and a depth of 40 cm, requiring 2000 sq. cm of desktop area.

In addition to their compact size, laptop computers typically have the advantage of being relatively light as compared to their desktop-sized counterparts, weighing perhaps 7 kg, and are usually provided with a battery power supply so that users may fully exploit their portability.

In order for laptop computers to retain functional compatibility with their desktop-sized counterparts and with currently available software, laptop machines should include many of the functional components found in desktop machines, including sufficient on-board memory, floppy disk and hard disk drives, display screens, expansion slots, and standard input/output ports. Additional features, such as built-in modems, may also be incorporated into laptop machines to complement their portable nature.

It is accordingly a feature of the present invention that an arrangement of components is provided which results in a compact, lightweight unit with an efficient and convenient user interface. Another feature of the invention is that th compact and lightweight configuration does not degrade the functionality of the system relative to a typical desktop computer, and that the resultant system incorporates laptop-specific capabilities not always found in desktop computers.

SUMMARY OF THE INVENTION

According to the present invention, the components of a laptop computer are arranged in a highly space-efficient yet convenient manner, so that the computer is compact, lightweight and easy-to-use. The computer of the present invention includes most of the functional components typically found in desk-top computers, such as both fixed and floppy disk drives, a full-size high-resolution display, serial communications and external VGA monitor ports, and a standard sized alphanumeric keyboard. Furthermore, a computer in accordance with the present invention allows for operation with AC power from an external AC power supply, or with a readily installed rechargeable battery pack, and can be equipped with an internal modem, memory expansion boards, and a floating-point numeric co-processor for increased system performance.

All of the above features can be incorporated into a housing which may be less than one-third the size of a comparable desktop computer. In addition, however, a computer in accordance with the present invention can be accompanied by an optional desktop expansion base which enables the computer to support a number of optional accessories, including industry standard expansion hardware. The desktop expansion base also provides an additional port for an external video graphics monitor, and an additional combination AC power supply/battery charger.

BRIEF DESCRIPTION OF THE DRAWINGS

The novel features believed characteristic of the invention are set forth in the appended claims. The invention itself, however, as well as other features and advantages thereof, will be best understood by reference to a detailed description of a specific embodiment which follows, when read in conjunction with the accompanying drawing, wherein:

DETAILED DESCRIPTION OF A SPECIFIC EMBODIMENT

Figure 1:
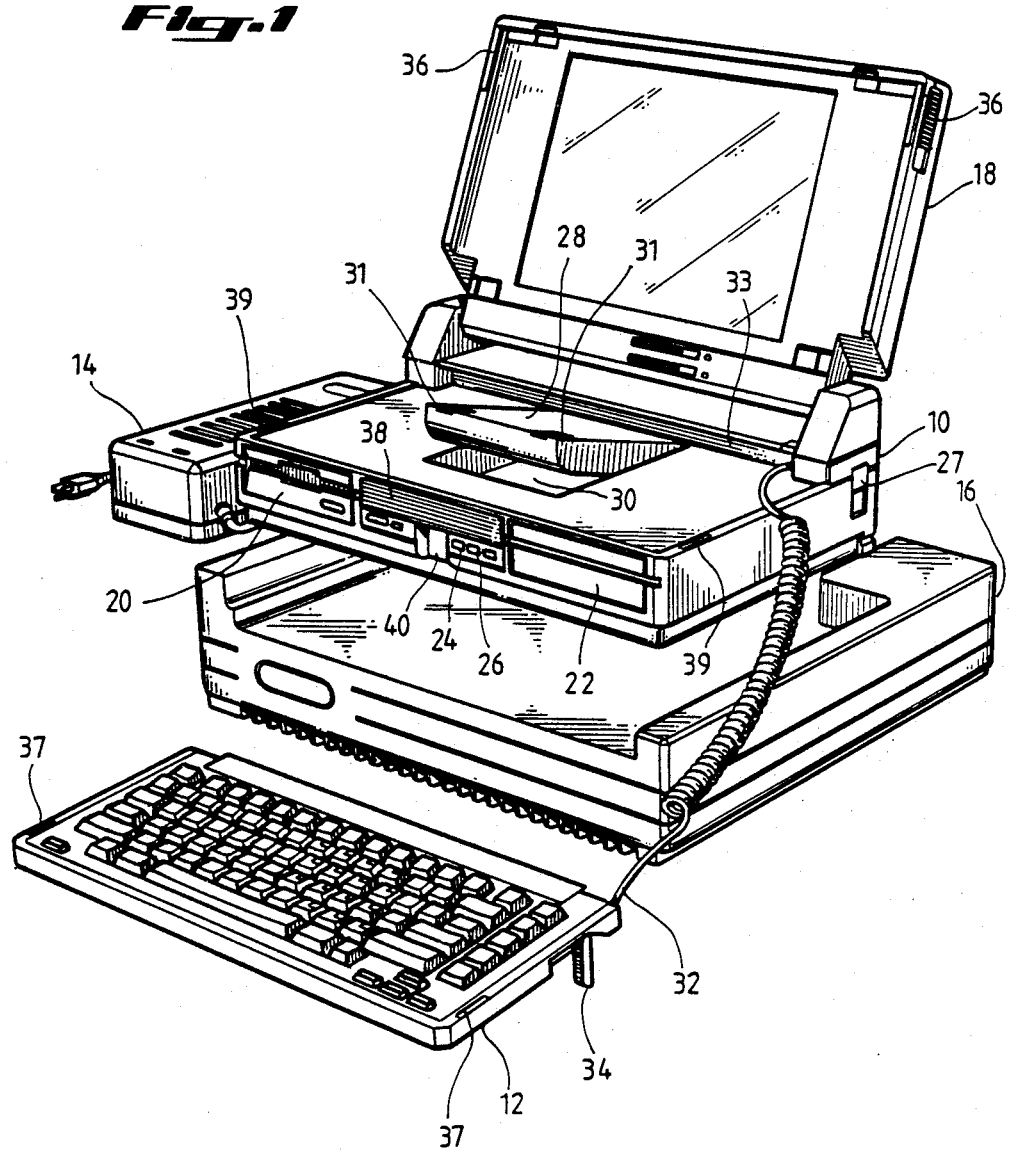
FIG. 1 is an illustration of a computer constructed in accordance with the present invention.

A portable or "laptop" style computer system is described in detail in the document entitled "COMPAQ SLT/286 PERSONAL COMPUTER FEATURES/-SPECIFICATIONS" (first edition, October 1988) published by Compaq Computer Corporation, which document is filed contemporaneously with this application and incorporation herein by reference.

Referring to FIG. 1, a laptop size computer system of the present invention is illustrated. The system comprises three major components: a main system unit 10, an alphanumeric keyboard 12, an external AC power supply 14, and a desktop expansion base 16.

Main system unit 10 and alphanumeric keyboard 12 together constitute a self-contained, fully functional personal-type computer system. Main system unit 10 includes a 25.4 cm (diagnal) monochrome LCD display screen 18 which folds down when not in use to function as a cover for main system unit 10 during transport or storage. Furthermore, main system unit 10 houses a three and one-half inch 1.44-megabyte or 720-kilobyte floppy disk drive 20 as well as a 20-megabyte or 40-megabyte fixed disk drive 22. Both floppy disk drive 20 and fixed disk drive 22 are situated generally in the front of main system unit 10, so that floppy disks are easily inserted and removed during use, and so that disk drive activity indicators 24, 26 are readily visible to the user. If an optional 2400-baud internal modem is installed in the computer of FIG. 1, a modem connection can be conveniently made using internal modem slot 27 on the side of main system unit 10. Although main system unit 10 is equipped with a 9-pin serial communication port, slot 27 can be user-configured to serve as an additional 9-pin serial port.

A rechargeable battery pack 28, such as a Nickel-Cadmium (NiCad) battery pack or the like is also incorporated into main system unit 10. Battery pack 28 allows for up to three hours of system use without AC power, and can be fully re-charged in less than three hours. The top of main system unit 10 has a rectangular opening therein for receiving battery pack 28, which is easily inserted or removed by a user. Battery pack 28 is secured in rectangular op-ening 30 by means of clasps 31. In "portable" applications where AC power is available, external AC power supply 14 can be connected to main unit 10; internal battery pack 28 is automatically charged whenever external power supply 14 is connected.

Keyboard 12 is attached to main system unit 10 by means of a coiled cable 32 so that during operation keyboard 12 can be located generally near main system unit 10, in any position that is convenient for a user. Furthermore, keyboard 12 has adjustable supports 34 so that it can be set at a convenient working angle with respect to a user. When the computer of FIG. 1 is not in use, keyboard supports 34 may be folded flush with the keyboard housing, and keyboard 12 placed above battery pack 28 on top of the main system unit 12. A small channel 33, running generally from the left side of the main unit to the right, below the display screen 18, is shaped to receive the coiled cable 32 and the rear edge of keyboard 12 when keyboard 12 is disposed on top of the main unit 10. This allows the display screen 18 to be folded down on top of main unit 10; then display screen 18 and keyboard 12 can be further secured in place by means of latches 36 which can extend from the display screen 18 through slots 37 in the keyboard and into similar slots in the housing of main system unit 10; in this closed state, the computer of FIG. 1 has approximate dimensions (height, depth, width, respectively) of 10.5 cm×21.5 cm×34.5 cm, weighs approximately 6.5-kilograms, and can be easily stored or transported. A retractable carrying handle 38 is normally inset to be flush with the front of the main system unit 10. When the main system unit 10 is folded closed as described above, a recess 40 in the front of the unit 10 allows retractable handle 38 to be pulled out, and the entire unit 10 including display screen 18 and keyboard 12 can be carried like a briefcase.

With continued reference to FIG. 1, a computer in one embodiment of the present invention can be "docked" in an optional desktop expansion base 16, which is precisely formed to receive the main system unit 10. A multi-pin electrical coupling (not shown in FIG. 1) is disposed near the rear of the base 16 in such a position as to mate with a complementary coupling on the rear of the main system unit 10. In this way, the main system unit is automatically electrically coupled whenever the unit 10 is docked in the desktop expansion base 16.

The expansion base 16 has two 8-bit or 16-bit industry standard expansion slots therein (not shown in FIG. 1) which serve to increase system flexibility and to provide the capablity to customize the system for particular applications and hardware configurations. For example, these slots can be used for local-area network (LAN) or other communication cards, so that the computer can become part of a larger system. In addition to these expansion slots, the expansion base 16 contains three standard interface ports (not shown in FIG. 1) which duplicate some ports already existing on the main system unit 10, including both parallel and parallel communications interface ports, an additional external VGA graphics monitor port and an external enhanced keyboard port. Since devices such as printers, high-resolution graphics monitors and enhanced keyboards can be permanently attached to the expansion base 16, the user can make a transition from an office or home environment to a portable environment without awkward cable connecting and disconnecting. Finally, the expansion base 16 includes an internal AC power supply which can trickle-charge or fast-charge the battery pack 28 in the main system unit 10 when the unit 10 is attached to the base 16.

From the above detailed description of a preferred embodiment, it should be evident that a laptop size computer system has been disclosed which is configured to provide maximum computing functionality in a housing of minimal size. Constructing a laptop computer in accordance with the present invention should result in a system which is compact, lightweight and easy to use.

Although a specific embodiment of the invention has been disclosed in detail, it is to be understood that various changes, alterations and substitutions can be made therein without departing from the spirit and scope of the present invention as defined by the appended claims. In particular, with reference to the specific dimensions recited in the detailed description, it should be obvious to one skilled in the art that the class of machines which are considered "laptop" in size includes computers of varying shapes and size.

What is claimed is:

1. A portable computer system comprising:

first housing means for containing a first set of computer components and a plurality of signal wires, said first housing means having a rectangular prism shape with substantially planar front, back, top, bottom and side faces;

said first housing means having an access slot in said front planar face;

said first set of computer components including a floppy disk drive, said floppy disk drive being positioned to allow for the insertion of floppy disks in said floppy disk drive through said access slot;

said first set of computer components further including a hard disk drive, said hard disk drive also being mounted in the front of said first housing means;

said first housing means having first and second indicator means mounted on said front planar face for indicating read or write access to said floppy disk drive and said hard disk drive;

an AC power supply for supplying power to said first set of computer components, and a battery power supply for supplying power to said first set of computer components, said battery power supply having a substantially rectangular prism shape;

said first housing means having a rectangular opening in said top planar face for receiving said battery power supply, said rectangular opening being formed to allow said battery power supply to be flush with said top planar face, said battery power supply having clasping means for holding said power supply in said rectangular opening;

a display screeen having substantially planar first and second faces;

hinging means coupling said display screen to said top planar face of said first housing means, said hinging means allowing said display screen to be moved either to upright positions or to a folded position;

keyboard means coupled to said first housing means via a cable, said keyboard means having adjustable rear support means capable of being folded flush with the surface of said keyboard;

said hinging means defining a channel running along said top planar surface of said first housing means generally between said side faces of said first housing means, said channel being sized to receive said cable when said keyboard is placed on the said top planar face of said first housing means, and being disposed directly above said battery power supply and immediately adjacent to said hinging means and said channel;

second housing means containing a plurality of signal wires, having a substantially rectangular prism shape and having a substantially rectangular recess for receiving said first housing means;

said first housing means and said second housing means having complementary coupling means which electrically couple said plurality of signal wires inside said first housing means with said plurality of signal wires inside said second housing means when said first housing means is inserted into said recess in said second housing means.

* * * * *

UNITED STATES PATENT AND TRADEMARK OFFICE
CERTIFICATE OF CORRECTION

PATENT NO. : 4,903,222
DATED : February 20, 1990
INVENTOR(S) : R, Richard Carter, Thomas Mitchell, Douglas C. Bushman It is certified that error appears in the above-identified patent and that said Letters Patent is hereby corrected as shown below:

On the title page:
Change name of Assignee from "Compag" to --Compaq--.

Column 1, line 6, change "inention" to --invention--.

Column 1, line 41, change "th" to --the--.

Column 2, line 27, change "incorporation" to --incorporated--.

Column 2, line 37, change "(diagnal)" to --(diagonal)--.

Column 2, line 63, change "op-ening" to --opening--.

Signed and Sealed this

Fifth Day of February, 1991

*Attest:*

HARRY F. MANBECK, JR.

*Attesting Officer*

*Commissioner of Patents and Trademarks*